US006763291B1

(12) United States Patent
Houpt et al.

(10) Patent No.: US 6,763,291 B1
(45) Date of Patent: Jul. 13, 2004

(54) METHOD AND APPARATUS FOR CONTROLLING A PLURALITY OF LOCOMOTIVES

(75) Inventors: Paul Kenneth Houpt, Schenectady, NY (US); Sunil Shirish Shah, Bangalore (IN); Harry Kirk Mathews, Jr., Clifton Park, NY (US); David So Keung Chan, Niskayuna, NY (US); Manthram Sivasubramaniam, Bangalore (IN); Raj Mohan Bharadwaj, Niskayuna, NY (US); Purnaprajna Raghavendra Mangsuli, Bangalore (IN); Venkateswaran Narayanan, Bangalore (IN)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/670,718

(22) Filed: Sep. 24, 2003

(51) Int. Cl.[7] .................................................. B60L 3/00
(52) U.S. Cl. ............................ 701/19; 701/20; 701/36; 701/70
(58) Field of Search ............................. 701/19, 20, 35, 701/36, 70; 324/160; 246/1 R, 2 R, 3

(56) References Cited

U.S. PATENT DOCUMENTS

| 4,344,364 A | | 8/1982 | Nickles et al. | |
|---|---|---|---|---|
| 4,750,888 A | * | 6/1988 | Allard et al. | ................. 434/69 |
| 5,239,472 A | | 8/1993 | Long et al. | |
| 5,354,202 A | * | 10/1994 | Moncrief et al. | ............. 434/69 |
| 5,744,707 A | * | 4/1998 | Kull | ............................ 73/121 |
| 5,758,299 A | * | 5/1998 | Sandborg et al. | ............ 701/29 |
| 6,144,901 A | | 11/2000 | Nickles et al. | |
| 6,263,266 B1 | | 7/2001 | Hawthorne | |
| 6,332,106 B1 | | 12/2001 | Hawthorne et al. | |
| 2001/0029411 A1 | | 10/2001 | Hawthorne | |

FOREIGN PATENT DOCUMENTS

| EP | 1136969 A2 | 9/2001 |
|---|---|---|
| WO | WO90/03622 | 4/1990 |
| WO | WO99/14093 | 3/1999 |
| WO | WO01/08955 A1 | 2/2001 |
| WO | WO01/08956 A1 | 2/2001 |
| WO | WO 01/08957 | 2/2001 |
| WO | WO 01/08958 | 2/2001 |
| WO | WO01/08959 | 2/2001 |
| WO | WO01/20587 A2 | 3/2001 |

OTHER PUBLICATIONS

U.S. patent application, Ser. No. 10/177,547 filed Jun. 21, 02, By Gerald Hess, Jr., et al., Entitled "Control and Method for Optimizing the Operation of Two or More Locomotives of a Consist", Attorney Docket 4069–2.

U.S. patent application, Ser. No. 10/429,596, filed May 5, 2003, By Gerald Hess, Jr., T al., Entitled "System and Method for Managing Two or More Locomotives of a Consist", Attorney Docket 4069–3.

"Select–A–Power, A Manual Fuel–Saving System for Simple, Positive Control", Harmon Electrics, Inc., Aug. 28, 1985, 7 pages.

* cited by examiner

Primary Examiner—Richard M. Camby
(74) Attorney, Agent, or Firm—Ann M. Agosti; Patrick K. Patnode

(57) ABSTRACT

An apparatus for controlling a plurality of locomotives, the locomotives being responsive to a plurality of discrete actual commands, the apparatus comprising: a combination generator adapted for generating combinations of the discrete actual commands to yield a command combination set; a performance calculator adapted for calculating a performance parameter set from the command combination set; a feasible combination selector adapted for selecting a feasible combination subset from the command combination set as a function of a discrete performance setpoint, a performance tolerance, and the performance parameter set; an objective function calculator adapted for calculating an objective function set from the feasible combination subset; and an optimal command selector adapted for selecting an optimal command combination from the feasible combination subset corresponding to an optimum value of the objective function set.

51 Claims, 6 Drawing Sheets

METHOD AND APPARATUS FOR CONTROLLING A PLURALITY OF LOCOMOTIVES

BACKGROUND

The present invention relates generally to the field of controlling locomotives and more specifically to the field of controlling a plurality of locomotives so as to optimize an objective function while satisfying constraints on a set of performance parameters.

Freight trains are often hauled by multiple locomotive ensembles ("consists") placed together at the front or rear of the train or dispersed among the freight cars. A single crew at the front of the train coordinates all the locomotive throttles and brake commands via a cable called the multiple unit line ("MU-line") that runs among the locomotives. The MU-line can also be implemented virtually using radio links.

For historical reasons, locomotive throttles are typically set up to have discrete settings ("notches," typically designated "idle" and "N1" through "N8") corresponding to different levels of pulling power. As locomotive speed varies, on board electronic control circuitry regulates the power production by electric traction motors to be approximately constant at a corresponding level defined for each notch. The locomotive carrying the train driver is designated the "lead locomotive"; the other locomotives are said to be "trailing" or "in trail." As conventionally coordinated, each locomotive in trail is operated at the same notch set by the train driver for the lead locomotive. As the train driver manipulates the throttle in the lead locomotive, the trailing locomotives conventionally follow in lock step producing a range of horse-power from idle up to the combined rating of the units, track conditions and speed limits permitting.

For each individual locomotive, fuel efficiency, as measured for example in pounds of fuel per horsepower-hour, generally improves with increasing power output. When less than full power is required from the overall consist, therefore, there is an efficiency penalty that results from operating all locomotives at the same low power setting. For example, a typical three locomotive consist operating with all locomotives in N4 produces substantially the same power but consumes more fuel than the same consist operating with one locomotive in N8 and the other two locomotives in idle. Opportunities exist, therefore, to improve overall consist efficiency by allowing the notches to be set independently on each locomotive.

SUMMARY

The opportunities described above are addressed, in one embodiment of the present invention, by an apparatus for controlling a plurality of locomotives, the locomotives being responsive to a plurality of discrete actual commands, the apparatus comprising: a combination generator adapted for generating combinations of the discrete actual commands to yield a command combination set; a performance calculator adapted for calculating a performance parameter set from the command combination set; a feasible combination selector adapted for selecting a feasible combination subset of the command combination set as a function of a discrete performance setpoint, a performance tolerance, and the performance parameter set; an objective function calculator adapted for calculating an objective function set from the feasible combination subset; and an optimal command selector adapted for selecting an optimal command combination from the feasible combination subset corresponding to an optimum value of the objective function set.

The present invention is also embodied as a method for controlling a plurality of locomotives, the locomotives being responsive to a plurality of discrete actual commands, the method comprising: generating combinations of the discrete actual commands to yield a command combination set; calculating a performance parameter set from the command combination set; selecting a feasible combination subset of the command combination set as a function of a discrete performance setpoint, a performance tolerance, and the performance parameter set; calculating an objective function set from the feasible combination subset; and selecting an optimal command combination from the feasible combination subset corresponding to an optimum value of the objective function set.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
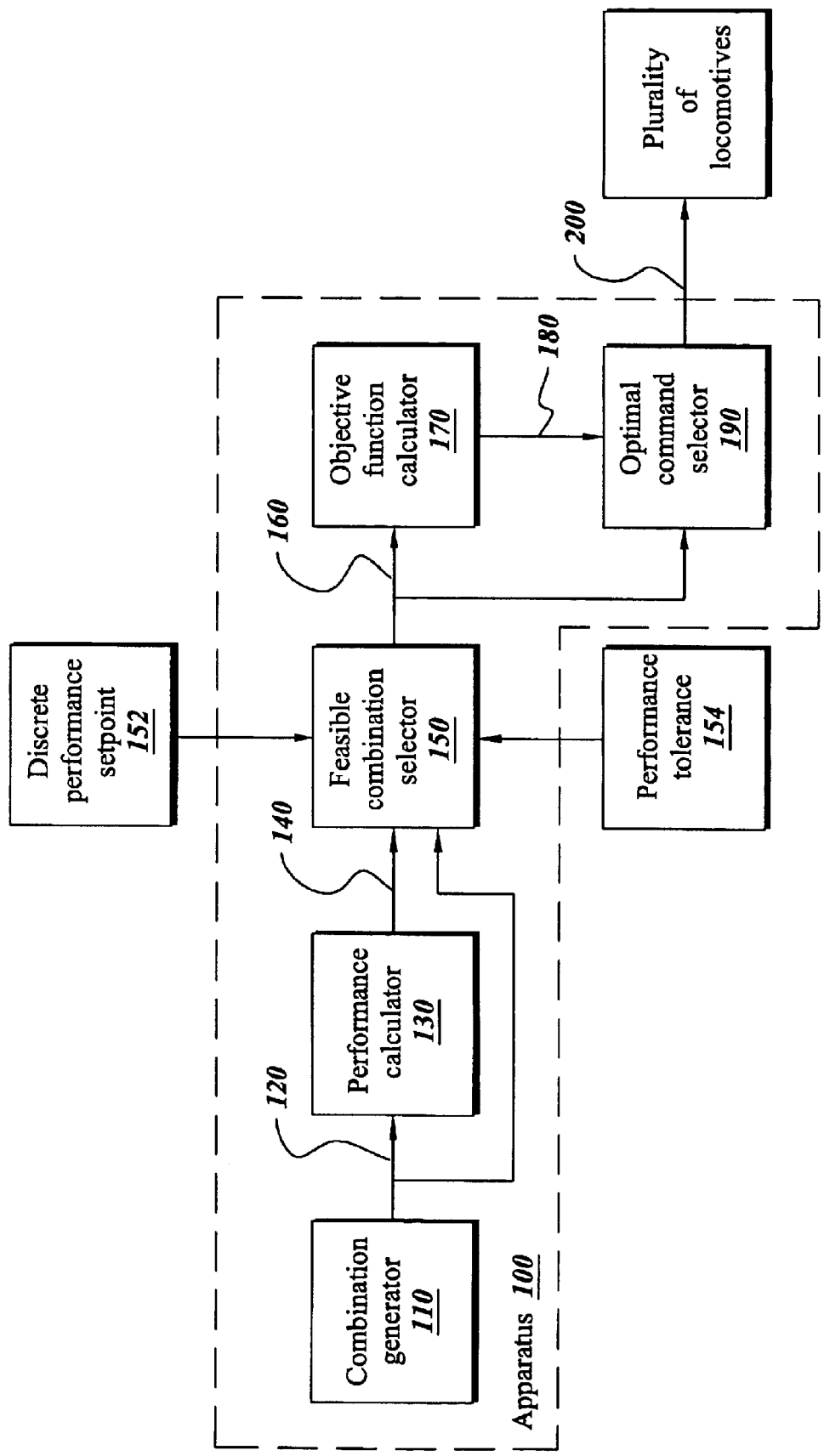
FIG. 1 illustrates a block diagram in accordance with one embodiment of the present invention.

In accordance with one embodiment of the present invention, FIG. 1 illustrates a block diagram of an apparatus 100 for controlling a plurality of locomotives responsive to a plurality of discrete actual commands. Apparatus 100 comprises a combination generator 110, a performance calculator 130, a feasible combination selector 150, an objective function calculator 170, and an optimal command selector 190. In operation, combination generator 110 generates combinations of the discrete actual commands to yield a command combination set 120. From command combination set 120, performance calculator 130 calculates a performance parameter set 140. Feasible combination selector 150 then selects a feasible combination subset 160 from command combination set 120 as a function of a discrete performance setpoint 152, a performance tolerance 154, and performance parameter set 140. From feasible combination subset 160, objective function calculator 170 calculates an objective function set 180. Optimal command selector 190 then selects an optimal command combination 200 from feasible combination subset 160 corresponding to an optimum value of objective function set 180.

In a more detailed embodiment in accordance with the embodiment of FIG. 1, combination generator 110 generates all possible combinations of discrete actual commands. Such an embodiment provides a "full optimization" by exhaustion.

In an alternative more detailed embodiment in accordance with the embodiment of FIG. 1, combination generator 110 generates only combinations wherein discrete actual commands corresponding to selected locomotives are equal. In other words, the selected locomotives are operated in lock step while the remaining locomotives are free to be operated independently. Such an embodiment provides a "partial optimization." For some applications, the partial optimization is significantly less expensive to implement than the full optimization and is therefore preferable despite the sacrifice of some optimization benefit.

In another more detailed embodiment in accordance with the embodiment of FIG. 1, performance calculator 130 calculates total power of the plurality of locomotives. In such an embodiment, discrete performance setpoint 152 is a request for a level of total consist power, performance tolerance 154 is a power tolerance, and the discrete actual commands are typically notches. Feasible combination subset 160 therefore contains only notch combinations that result in a total consist power within the power tolerance of the request.

In still another more detailed embodiment in accordance with the embodiment of FIG. 1, discrete performance setpoint 152 has a finer resolution than the discrete actual commands. As used herein, a discrete signal X "has a finer resolution" than a discrete signal Y if the number of discrete values of discrete signal X is greater than the number of discrete values of signal Y. Consider, for example, a consist of three locomotives each responsive to nine levels (i.e., idle plus N1 through N8). If operated conventionally in lock step, only nine discrete values of total consist power can be achieved. If operated in accordance with the present embodiment, however, at least twenty-five discrete values of total consist power can be achieved.

In yet another more detailed embodiment in accordance with the embodiment of FIG. 1 objective function calculator 170 calculates a quantity selected from the group consisting of fuel efficiency, fuel remaining in each locomotive, engine wear, cab noise, and deviation from discrete performance setpoint 152.

Figure 2:
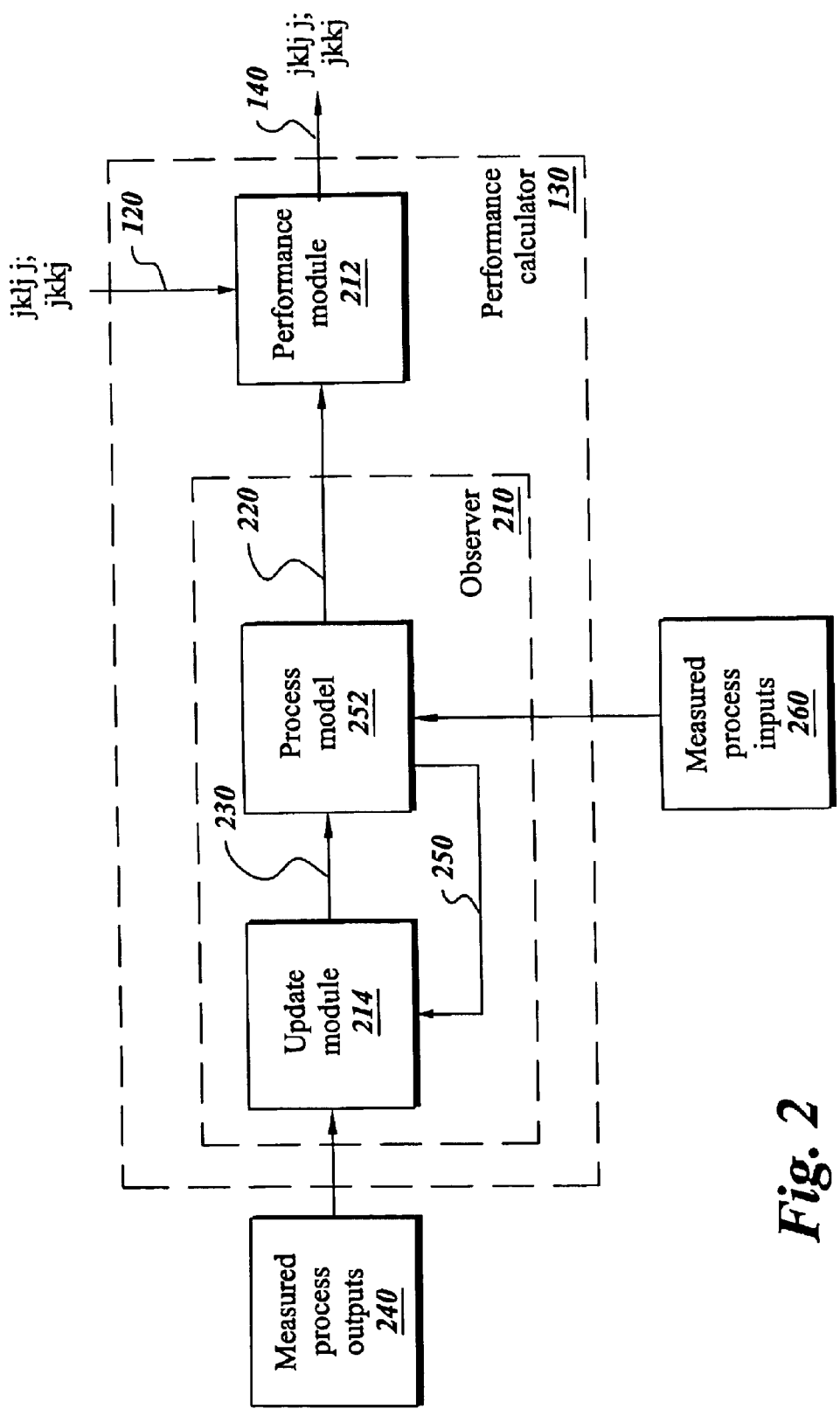
FIG. 2 illustrates a block diagram in accordance with a more specific embodiment of the embodiment of FIG. 1.

In accordance with a more specific embodiment of the embodiment of FIG. 1, FIG. 2 illustrates a block diagram wherein performance calculator 130 further comprises an observer 210 and a performance module 212. In operation, observer 210 estimates a set of estimated state variables 220 corresponding to the locomotives, and performance module 212 calculates performance parameter set 140 from command combination set 120 and estimated state variables 220.

Observer 210 comprises an update module 214 and a process model 252. In operation, update module 214 generates state update signals 230 from measured process outputs 240 and predicted process outputs 250. Process model 252 propagates estimated state variables 220 and calculates predicted process outputs 250 using state update signals 230 and a set of measured process inputs 260. Examples of observer 210 include, without limitation, Luenberger observers, extended observers, and finite- or infinite-horizon Kalman filters, and extended Kalman filters.

In a more detailed embodiment in accordance with the embodiment of FIG. 2, observer 210 is an extended Kalman filter.

Figure 3:
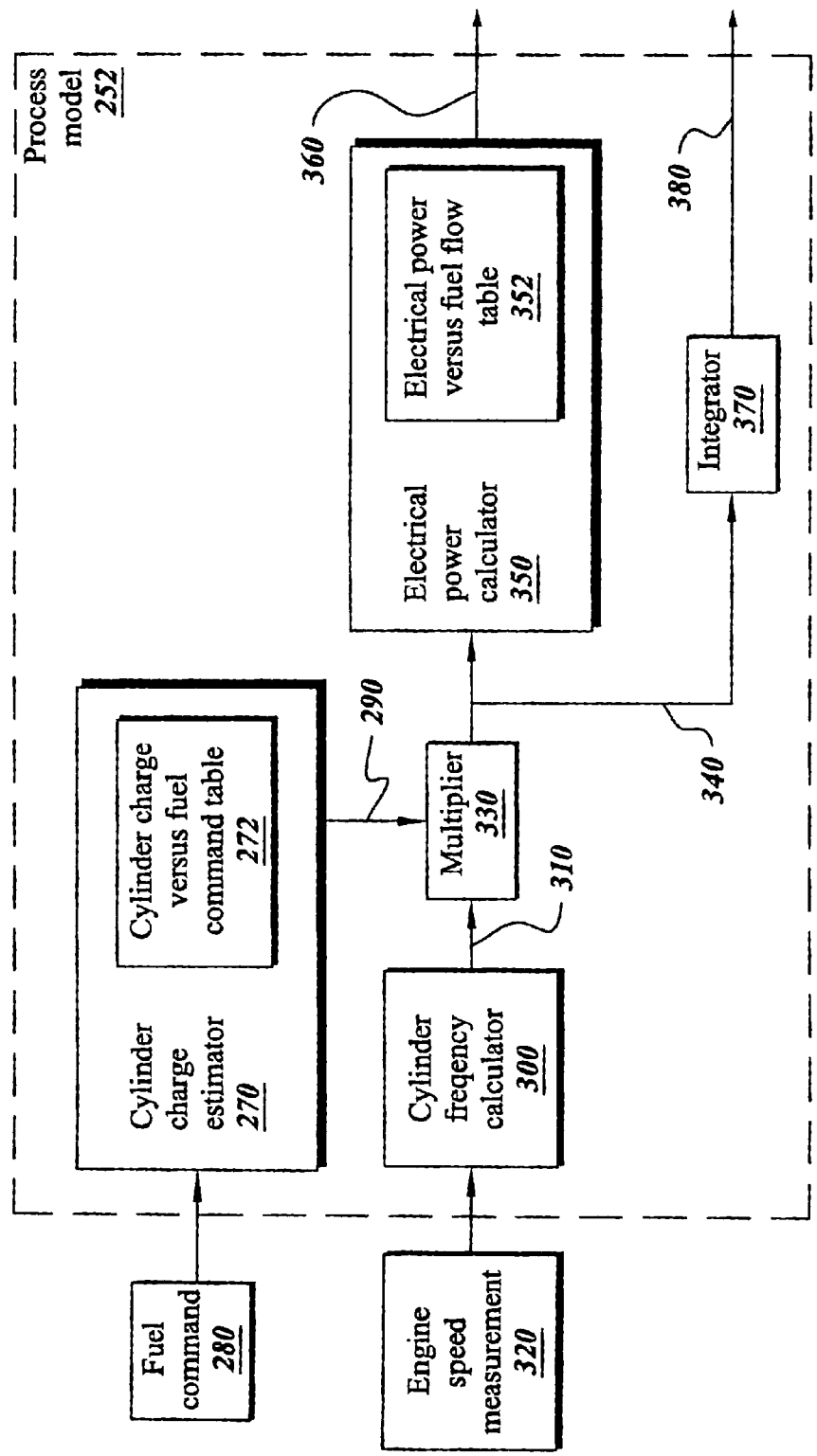
FIG. 3 illustrates a block diagram in accordance with a more specific embodiment of the embodiment of FIG. 2.

In accordance with a more specific embodiment of the embodiment of FIG. 2, FIG. 3 illustrates a block diagram wherein process model 252 comprises a cylinder charge estimator 270, a cylinder frequency calculator 300, a multiplier 330, an electrical power calculator 350, and an integrator 370. In operation, cylinder charge estimator 270 estimates a cylinder charge 290 (in units, for example, of liters per deflagration) from a fuel command 280 using a cylinder charge versus fuel command table 272. Cylinder frequency calculator 300 calculates a cylinder frequency 310 (in units, for example, of deflagrations per second) from an engine speed measurement 320. To yield a fuel flow estimate 340 (in units, for example, of liters per second), multiplier 330 multiplies cylinder charge 290 by cylinder frequency 310. Electrical power calculator 350 then calculates an electrical power estimate 360 from fuel flow estimate 340 using an electrical power versus fuel flow table 352. Fuel flow estimate 340 is integrated with respect to time by integrator 370 to yield a consumed fuel volume estimate 380. In the FIG. 3 embodiment of process model 252: state variables 220 comprise elements of cylinder charge versus fuel command table 272, elements of electrical power versus fuel flow table 352, and consumed fuel volume estimate 380; measured process inputs 260 comprise fuel command 280 and engine speed measurement 320; predicted process outputs 250 comprise electrical power estimate 360 and consumed fuel volume estimate 380; and measured process outputs 240 comprise an electrical power measurement and a consumed fuel volume measurement (not shown).

Figure 4:
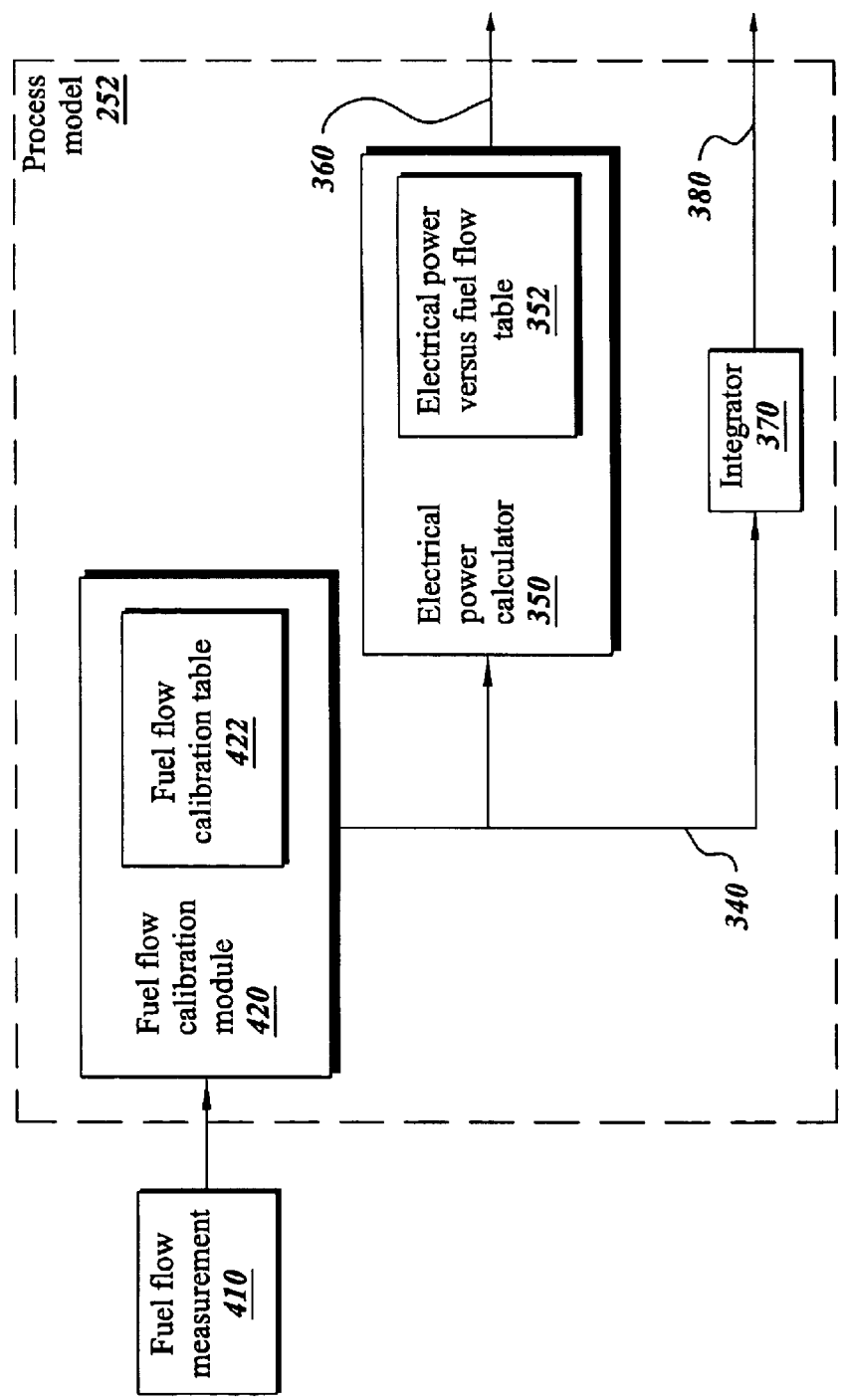
FIG. 4 illustrates a block diagram in accordance with another more specific embodiment of the embodiment of FIG. 2.

In accordance with another more specific embodiment of the embodiment of FIG. 2, FIG. 4 illustrates a block diagram wherein process model 252 comprises a fuel flow calibration module 420, an electrical power calculator 350, and an integrator 370. In operation, fuel flow calibration module 420 generates a fuel flow estimate 340 from a fuel flow measurement 410 using a fuel flow calibration table 422. From fuel flow estimate 340, electrical power calculator 350 calculates an electrical power estimate 360 using an electrical power versus fuel flow table 352. Integrator 370 then integrates fuel flow estimate 340 over time to yield a consumed fuel volume estimate 380. In the FIG. 4 embodiment of process model 252: state variables 220 comprise elements of fuel flow calibration table 422, elements of electrical power versus fuel flow table 352, and consumed fuel volume estimate 380; measured process inputs 260 comprise fuel flow measurement 410; predicted process outputs 250 comprise electrical power estimate 360 and consumed fuel volume estimate 380; and measured process outputs 240 comprise an electrical power measurement 390 and a consumed fuel volume measurement (not shown).

Figure 5:
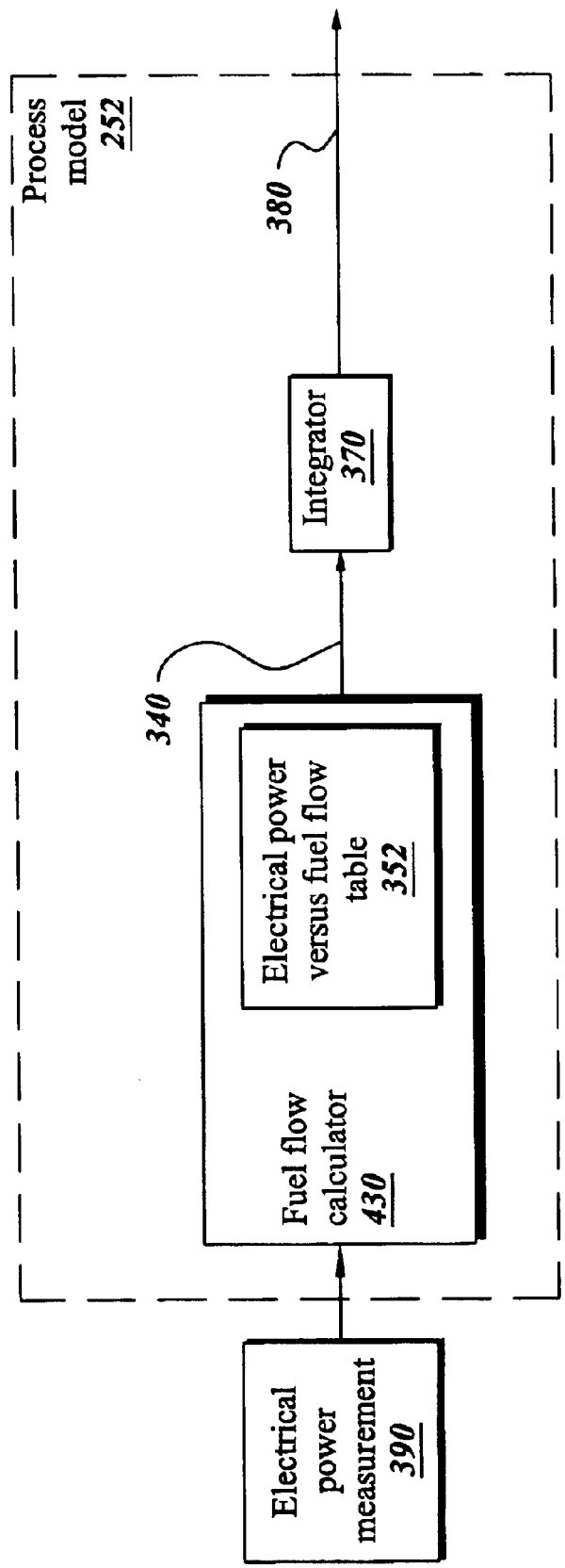
FIG. 5 illustrates a block diagram in accordance with still another more specific embodiment of the embodiment of FIG. 2.

In accordance with still another more specific embodiment of the embodiment of FIG. 2, FIG. 5 illustrates a block diagram wherein process model 252 comprises a fuel flow calculator 430 and an integrator 370. In operation, fuel flow calculator 430 generates a fuel flow estimate 340 from an electrical power measurement 390 using an electrical power versus fuel flow table 352. Integrator 370 integrates fuel flow estimate 340 over time to yield a consumed fuel volume estimate 380. In the FIG. 5 embodiment of process model 252, state variables 220 comprise elements of electrical power versus fuel flow table 352 and consumed fuel volume estimate 380; measured process inputs 260 comprise electrical power measurement 390; predicted process outputs 250 comprise consumed fuel volume estimate 380; and measured process outputs 240 comprise a consumed fuel volume measurement (not shown).

Figure 6:
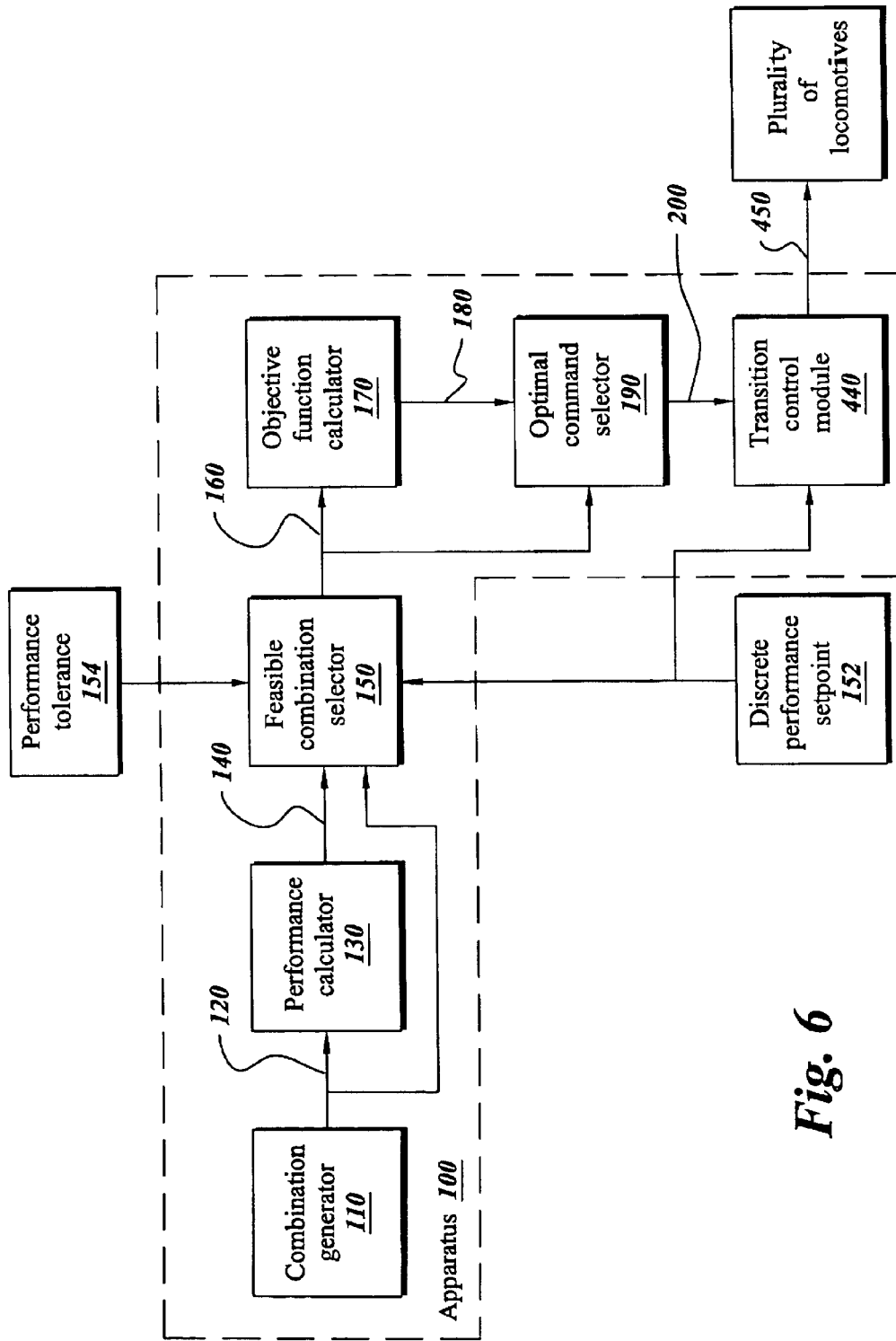
FIG. 6 illustrates a block diagram in accordance with another embodiment of the present invention.

In accordance with another embodiment of the present invention, FIG. 6 illustrates a block diagram wherein apparatus 100 further comprises a transition control module 440. In operation, transition control module 440 computes an applied command combination 450 from discrete performance setpoint 152 and optimal command combination 200 using a transition control method. The transition control method comprises ramping elements of applied command combination 450 toward respective elements of optimal command combination 200, but delaying the ramping of a subset of the elements to minimize an adverse performance response. As used herein, an "adverse performance response" refers to an undesirable characteristic of a time history of a performance parameter. For example, a response to a requested increase in total consist power wherein the time history of total consist power was not monotonically increasing would be an adverse performance response.

By way of example, but not limitation, suppose: discrete performance setpoint 152 is a request for a level of total consist power; the discrete actual commands are notches; there are two locomotives in the consist; the leading locomotive is currently at N8 and the trailing locomotive is currently at idle, represented as the ordered notch pair (8, 0); and the next value of discrete performance setpoint 152 corresponds to notch pair (5, 5). If the notches for both locomotives are ramped together, a first sequence would be (7, 1), (6, 2), (5, 3), (5, 4), (5, 5). If the ramp of the lead locomotive is delayed two periods, a second sequence would be (8, 1), (8, 2), (7, 3), (6, 4), (5, 5). For locomotives with notches equally spaced in power, the first sequence exhibits an adverse performance response in that the total consist power fails to increase in the first two time periods. The second sequence minimizes that adverse performance response by causing the total consist power to increase immediately. More complicated situations arise when the notch powers are not equally spaced.

In a more specific embodiment in accordance with the embodiment of FIG. 6, the act of delaying ramping further comprises waiting a specified time. The specified time is a function of optimal command combination 200 and of a previous value of applied command combination 450. In some embodiments, the specified time is a tabulated function pre-computed to minimize an adverse performance response.

In another more specific embodiment in accordance with the embodiment of FIG. 6, the act of delaying ramping further comprises calculating a predicted performance response due to ramping elements of applied command combination 450, and delaying ramping of a subset of the elements until the predicted performance response satisfies a transition performance criterion. In contrast to the previous embodiments, instead of waiting a pre-computed time, this embodiment decides in real time whether the response to ramping applied command combination 450 will be acceptable.

All of the above described elements of embodiments of the present invention may be implemented, by way of example, but not limitation, using singly or in combination any electric or electronic devices capable of performing the indicated functions. Examples of such devices include, without limitation: analog devices; analog computation modules; digital devices including, without limitation, small-, medium-, and large-scale integrated circuits, application specific integrated circuits (ASICs), and programmable logic arrays (PLAs); and digital computation modules including, without limitation, microcomputers, microprocessors, microcontrollers, and programmable logic controllers (PLCs).

In some implementations, the above described elements of the present invention are implemented as software components in a general purpose computer. Such software implementations produce a technical effect of controlling the plurality of locomotives so as to optimize a selected objective function.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. An apparatus for controlling a plurality of locomotives, said locomotives being responsive to a plurality of discrete actual commands, said apparatus comprising:
   a combination generator adapted for generating combinations of said discrete actual commands to yield a command combination set;
   a performance calculator adapted for calculating a performance parameter set from said command combination set;
   a feasible combination selector adapted for selecting a feasible combination subset from said command combination set as a function of a discrete performance setpoint, a performance tolerance, and said performance parameter set;
   an objective function calculator adapted for calculating an objective function set from said feasible combination subset; and
   an optimal command selector adapted for selecting an optimal command combination from said feasible combination subset corresponding to an optimum value of said objective function set.

2. The apparatus of claim 1 wherein said combination generator is further adapted for generating all possible combinations of said discrete actual commands.

3. The apparatus of claim 1 wherein said combination generator is further adapted for generating only combinations wherein said discrete actual commands corresponding to selected locomotives are equal.

4. The apparatus of claim 1 wherein:
   said performance calculator is further adapted for calculating total power of said plurality of locomotives;
   said discrete performance setpoint is a request for a level of said total power;
   said performance tolerance is a power tolerance; and
   said feasible combination subset contains only said combinations of said discrete actual commands resulting in said total power within said power tolerance of said request.

5. The apparatus of claim 1 wherein said discrete performance setpoint has a finer resolution than said discrete actual commands.

6. The apparatus of claim 1 wherein said objective function calculator is further adapted for calculating a quantity selected from the group consisting of fuel efficiency, fuel remaining in each locomotive, engine wear, cab noise, and deviation from said discrete performance setpoint.

7. The apparatus of claim 1 wherein said performance calculator further comprises:
   an observer adapted for estimating a set of estimated state variables corresponding to said locomotives; and
   a performance module adapted for calculating said performance parameter set from said command combination set and said estimated state variables,
   said observer comprising:
   an update module adapted for generating state update signals from measured process outputs and predicted process outputs; and
   a process model adapted for propagating said estimated state variables and calculating said predicted process outputs using said state update signals and a set of measured process inputs.

8. The apparatus of claim 7 wherein said observer is an extended Kalman filter.

9. The apparatus of claim 7 wherein said process model comprises:
   a cylinder charge estimator adapted for estimating a cylinder charge from a fuel command using a cylinder charge versus fuel command table;
   a cylinder frequency calculator adapted for calculating a cylinder frequency from an engine speed measurement;
   a multiplier adapted for multiplying said cylinder charge by said cylinder frequency to yield a fuel flow estimate;
   an electrical power calculator adapted for calculating an electrical power estimate from said fuel flow estimate using an electrical power versus fuel flow table; and
   an integrator adapted for integrating said fuel flow estimate to yield a consumed fuel volume estimate, said state variables comprising elements of said cylinder charge versus fuel command table, elements of said electrical power versus fuel flow table, and said consumed fuel volume estimate, said measured process inputs comprising said fuel command and said engine speed measurement, said predicted process outputs comprising said electrical power estimate and said consumed fuel volume estimate, said measured process outputs comprising an electrical power measurement and a consumed fuel volume measurement.

10. The apparatus of claim 7 wherein said process model comprises:

a fuel flow calibration module adapted for generating a fuel flow estimate from a fuel flow measurement using a fuel flow calibration table;

an electrical power calculator adapted for calculating an electrical power estimate from said fuel flow estimate using an electrical power versus fuel flow table; and an integrator adapted for integrating said fuel flow estimate to yield a consumed fuel volume estimate, said state variables comprising elements of said fuel flow calibration table, elements of said electrical power versus fuel flow table, and said consumed fuel volume estimate, said measured process inputs comprising said fuel flow measurement, said predicted process outputs comprising said electrical power estimate and said consumed fuel volume estimate, said measured process outputs comprising an electrical power measurement and a consumed fuel volume measurement.

11. The apparatus of claim 7 wherein said process model comprises:

a fuel flow calculator adapted for generating a fuel flow estimate from an electrical power measurement using an electrical power versus fuel flow table; and an integrator adapted for integrating said fuel flow estimate to yield a consumed fuel volume estimate, said state variables comprising elements of said electrical power versus fuel flow table, and said consumed fuel volume estimate, said measured process inputs comprising said electrical power measurement, said predicted process outputs comprising said consumed fuel volume estimate, said measured process outputs comprising a consumed fuel volume measurement.

12. The apparatus of claim 1 further comprising a transition control module adapted for computing an applied command combination from said discrete performance setpoint and said optimal command combination using a transition control method comprising:

ramping elements of said applied command combination toward respective elements of said optimal command combination; and delaying said ramping of a subset of said elements of said applied command combination to minimize an adverse performance response.

13. The apparatus of claim 12 wherein said act of delaying said ramping further comprises waiting a specified time, said specified time being a function of said optimal command combination and a previous value of said applied command combination.

14. The apparatus of claim 12 wherein said act of delaying said ramping further comprises:

calculating a predicted performance response due to said ramping said elements of said applied command combination; and delaying said ramping of said subset of said elements of said applied command combination until said predicted performance response satisfies a transition performance criterion.

15. An apparatus for controlling a plurality of locomotives, said locomotives being responsive to a plurality of discrete actual commands, said apparatus comprising:

a combination generator adapted for generating combinations of said discrete actual commands to yield a command combination set;

a performance calculator adapted for calculating a performance parameter set from said command combination set;

a feasible combination selector adapted for selecting a feasible combination subset from said command combination set as a function of a discrete performance setpoint, a performance tolerance, and said performance parameter set;

an objective function calculator adapted for calculating an objective function set from said feasible combination subset; and an optimal command selector adapted for selecting an optimal command combination from said feasible combination subset corresponding to an optimum value of said objective function set, said performance calculator being further adapted for calculating total power of said plurality of locomotives, said discrete performance setpoint being a request for a level of said total power, said performance tolerance being a power tolerance, said feasible combination subset containing only said combinations of said discrete actual commands resulting in said total power within said power tolerance of said request, said discrete performance setpoint having a finer resolution than said discrete actual commands.

16. The apparatus of claim 15 wherein said combination generator is further adapted for generating all possible combinations of said discrete actual commands.

17. Me apparatus of claim 15 wherein said combination generator is further adapted for generating only combinations wherein said discrete actual commands corresponding to selected locomotives are equal.

18. The apparatus of claim 15 wherein said objective function calculator is further adapted for calculating a quantity selected from the group consisting of fuel efficiency, fuel remaining in each locomotive, engine wear, cab noise, and deviation from said discrete performance setpoint.

19. The apparatus of claim 15 wherein said performance calculator further comprises:

an observer adapted for estimating a set of estimated state variables corresponding to said locomotives; and a performance module adapted for calculating said performance parameter set from said command combination set and said estimated state variables, said observer comprising:

an update module adapted for generating state update signals from measured process outputs and predicted process outputs; and a process model adapted for propagating said estimated state variables and calculating said predicted process outputs using said state update signals and a set of measured process inputs.

20. The apparatus of claim 19 wherein said process model comprises:
a cylinder charge estimator adapted for estimating a cylinder charge from a fuel command using a cylinder charge versus fuel command table;
a cylinder frequency calculator adapted for calculating a cylinder frequency from an engine speed measurement;
a multiplier adapted for multiplying said cylinder charge by said cylinder frequency to yield a fuel flow estimate;
an electrical power calculator adapted for calculating an electrical power estimate from said fuel flow estimate using an electrical power versus fuel flow table; and
an integrator adapted for integrating said fuel flow estimate to yield a consumed fuel volume estimate,
said state variables comprising elements of said cylinder charge versus fuel command table, elements of said electrical power versus fuel flow table, and said consumed fuel volume estimate,
said measured process inputs comprising said fuel command and said engine speed measurement,
said predicted process outputs comprising said electrical power estimate and said consumed fuel volume estimate,
said measured process outputs comprising an electrical power measurement and a consumed fuel volume measurement.

21. The apparatus of claim 19 wherein said process model comprises:
a fuel flow calibration module adapted for generating a fuel flow estimate from a fuel flow measurement using a fuel flow calibration table;
an electrical power calculator adapted for calculating an electrical power estimate from said fuel flow estimate using an electrical power versus fuel flow table; and
an integrator adapted for integrating said fuel flow estimate to yield a consumed fuel volume estimate,
said state variables comprising elements of said fuel flow calibration table, elements of said electrical power versus fuel flow table, and said consumed fuel volume estimate,
said measured process inputs comprising said fuel flow measurement,
said predicted process outputs comprising said electrical power estimate and said consumed fuel volume estimate,
said measured process outputs comprising an electrical power measurement and a consumed fuel volume measurement.

22. The apparatus of claim 19 wherein said process model comprises:
a fuel flow calculator adapted for generating a fuel flow estimate from an electrical power measurement using an electrical power versus fuel flow table; and
an integrator adapted for integrating said fuel flow estimate to yield a consumed fuel volume estimate,
said state variables comprising elements of said electrical power versus fuel flow table, and said consumed fuel volume estimate,
said measured process inputs comprising said electrical power measurement,
said predicted process outputs comprising said consumed fuel volume estimate,
said measured process outputs comprising a consumed fuel volume measurement.

23. The apparatus of claim 15 further comprising a transition control module adapted for computing an applied command combination from said discrete performance setpoint and said optimal command combination using a transition control method comprising:
ramping elements of said applied command combination toward respective elements of said optimal command combination; and
delaying said ramping of a subset of said elements of said applied command combination to minimize an adverse performance response.

24. The apparatus of claim 23 wherein said act of delaying said ramping further comprises waiting a specified time, said specified time being a function of said optimal command combination and a previous value of said applied command combination.

25. The apparatus of claim 23 wherein said act of delaying said ramping further comprises:
calculating a predicted performance response due to said ramping said elements of said applied command combination; and
delaying said ramping of said subset of said elements of said applied command combination until said predicted performance response satisfies a transition performance criterion.

26. A method for controlling a plurality of locomotives, said locomotives being responsive to a plurality of discrete actual commands, said method comprising:
generating combinations of said discrete actual commands to yield a command combination set;
calculating a performance parameter set from said command combination set;
selecting a feasible combination subset from said command combination set as a function of a discrete performance setpoint, a performance tolerance, and said performance parameter set;
calculating an objective function set from said feasible combination subset; and
selecting an optimal command combination from said feasible combination subset corresponding to an optimum value of said objective function set.

27. The method of claim 26 wherein said act of generating combinations further comprises generating all possible combinations of said discrete actual commands.

28. The method of claim 26 wherein said act of generating combinations further comprises generating only combinations wherein said discrete actual commands corresponding to selected locomotives are equal.

29. The method of claim 26 wherein said act of calculating a performance parameter set further comprises calculating total power of said plurality of locomotives,
said discrete performance setpoint being a request for a level of said total power,
said performance tolerance being a power tolerance,
said feasible combination subset containing only said combinations of said discrete actual commands resulting in said total power within said power tolerance of said request.

30. The method of claim 26 wherein said discrete performance setpoint has a finer resolution than said discrete actual commands.

31. The method of claim 26 wherein said act of calculating an objective function set further comprises calculating a quantity selected from the group consisting of fuel efficiency, fuel remaining in each locomotive, engine wear, cab noise, and deviation from said discrete performance setpoint.

32. The method of claim 26 wherein said act of calculating a performance parameter set further comprises:
  estimating a set of estimated state variables corresponding to said locomotives; and
  calculating said performance parameter set from said command combination set and said estimated state variables,
  said act of estimating a set of estimated state variables comprising:
    generating state update signals from measured process outputs and predicted process outputs; and
    propagating said estimated state variables and calculating said predicted process outputs using said state update signals and a set of measured process inputs.

33. The method of claim 32 wherein said act of estimating a set of estimated state variables implements an extended Kalman filter.

34. The method of claim 32 wherein said act of propagating said estimated state variables and calculating said predicted process outputs comprises:
  estimating a cylinder charge from a fuel command using a cylinder charge versus fuel command table;
  calculating a cylinder frequency from an engine speed measurement;
  multiplying said cylinder charge by said cylinder frequency to yield a fuel flow estimate;
  calculating an electrical power estimate from said fuel flow estimate using an electrical power versus fuel flow table; and
  integrating said fuel flow estimate to yield a consumed fuel volume estimate,
  said state variables comprising elements of said cylinder charge versus fuel command table, elements of said electrical power versus fuel flow table, and said consumed fuel volume estimate,
  said measured process inputs comprising said fuel command and said engine speed measurement,
  said predicted process outputs comprising said electrical power estimate and said consumed fuel volume estimate,
  said measured process outputs comprising an electrical power measurement and a consumed fuel volume measurement.

35. The method of claim 32 wherein said act of propagating said estimated state variables and calculating said predicted process outputs comprises:
  generating a fuel flow estimate from a fuel flow measurement using a fuel flow calibration table;
  calculating an electrical power estimate from said fuel flow estimate using an electrical power versus fuel flow table; and
  integrating said fuel flow estimate to yield a consumed fuel volume estimate,
  said state variables comprising elements of said fuel flow calibration table, elements of said electrical power versus fuel flow table, and said consumed fuel volume estimate,
  said measured process inputs comprising said fuel flow measurement,
  said predicted process outputs comprising said electrical power estimate and said consumed fuel volume estimate,
  said measured process outputs comprising an electrical power measurement and a consumed fuel volume measurement.

36. The method of claim 32 wherein said act of propagating said estimated state variables and calculating said predicted process outputs comprises:
  generating a fuel flow estimate from an electrical power measurement using an electrical power versus fuel flow table; and
  integrating said fuel flow estimate to yield a consumed fuel volume estimate,
  said state variables comprising elements of said electrical power versus fuel flow table, and said consumed fuel volume estimate,
  said measured process inputs comprising said electrical power measurement,
  said predicted process outputs comprising said consumed fuel volume estimate,
  said measured process outputs comprising a consumed fuel volume measurement.

37. The method of claim 26 further comprising computing an applied command combination from said discrete performance setpoint and said optimal command combination using a transition control method comprising:
  ramping elements of said applied command combination toward respective elements of said optimal command combination; and
  delaying said ramping of a subset of said elements of said applied command combination to minimize an adverse performance response.

38. The method of claim 37 wherein said act of delaying said ramping further comprises waiting a specified time, said specified time being a function of said optimal command combination and a previous value of said applied command combination.

39. The method of claim 37 wherein said act of delaying said ramping further comprises:
  calculating a predicted performance response due to said ramping said elements of said applied command combination; and
  delaying said ramping of said subset of said elements of said applied command combination until said predicted performance response satisfies a transition performance criterion.

40. A method for controlling a plurality of locomotives, said locomotives being responsive to a plurality of discrete actual commands, said method comprising:
  generating combinations of said discrete actual commands to yield a command combination set;
  calculating a performance parameter set from said command combination set;
  selecting a feasible combination subset from said command combination set as a function of a discrete performance setpoint, a performance tolerance, and said performance parameter set;
  calculating an objective function set from said feasible combination subset; and
  selecting an optimal command combination from said feasible combination subset corresponding to an optimum value of said objective function set,
  said act of calculating a performance parameter set further comprising calculating total power of said plurality of locomotives,
  said discrete performance setpoint being a request for a level of said total power,
  said performance tolerance being a power tolerance,
  said feasible combination subset containing only said combinations of said discrete actual commands resulting in said total power within said power tolerance of said request,
  said discrete performance setpoint having a finer resolution than said discrete actual commands.

41. The method of claim 40 wherein said act of generating combinations further comprises generating all possible combinations of said discrete actual commands.

42. The method of claim 40 wherein said act of generating combinations further comprises generating only combinations wherein said discrete actual commands corresponding to selected locomotives are equal.

43. The method of claim 40 wherein said act of calculating an objective function set further comprises calculating a quantity selected from the group consisting of fuel efficiency, fuel remaining in each locomotive, engine wear, cab noise, and deviation from said discrete performance setpoint.

44. The method of claim 40 wherein said act of calculating a performance parameter set further comprises:
   estimating a set of estimated state variables corresponding to said locomotives; and
   calculating said performance parameter set from said command combination set and said estimated state variables,
   said act of estimating a set of estimated state variables comprising:
   generating state update signals from measured process outputs and predicted process outputs; and
   propagating said estimated state variables and calculating said predicted process outputs using said state update signals and a set of measured process inputs.

45. The method of claim 44 wherein said act of estimating a set of estimated state variables implements an extended Kalman filter.

46. The method of claim 44 wherein said act of propagating said estimated state variables and calculating said predicted process outputs comprises:
   estimating a cylinder charge from a fuel command using a cylinder charge versus fuel command table;
   calculating a cylinder frequency from an engine speed measurement;
   multiplying said cylinder charge by said cylinder frequency to yield a fuel flow estimate;
   calculating an electrical power estimate from said fuel flow estimate using an electrical power versus fuel flow table; and
   integrating said fuel flow estimate to yield a consumed fuel volume estimate,
   said state variables comprising elements of said cylinder charge versus fuel command table, elements of said electrical power versus fuel flow table, and said consumed fuel volume estimate,
   said measured process inputs comprising said fuel command and said engine speed measurement,
   said predicted process outputs comprising said electrical power estimate and said consumed fuel volume estimate,
   said measured process outputs comprising an electrical power measurement and a consumed fuel volume measurement.

47. The method of claim 44 wherein said act of propagating said estimated state variables and calculating said predicted process outputs comprises:
   generating a fuel flow estimate from a fuel flow measurement using a fuel flow calibration table;
   calculating an electrical power estimate from said fuel flow estimate using an electrical power versus fuel flow table; and
   integrating said fuel flow estimate to yield a consumed fuel volume estimate,
   said state variables comprising elements of said fuel flow calibration table, elements of said electrical power versus fuel flow table, and said consumed fuel volume estimate,
   said measured process inputs comprising said fuel flow measurement,
   said predicted process outputs comprising said electrical power estimate and said consumed fuel volume estimate,
   said measured process outputs comprising an electrical power measurement and a consumed fuel volume measurement.

48. The method of claim 44 wherein said act of propagating said estimated state variables and calculating said predicted process outputs comprises:
   generating a fuel flow estimate from an electrical power measurement using an electrical power versus fuel flow table; and
   integrating said fuel flow estimate to yield a consumed fuel volume estimate,
   said state variables comprising elements of said electrical power versus fuel flow table, and said consumed fuel volume estimate,
   said measured process inputs comprising said electrical power measurement,
   said predicted process outputs comprising said consumed fuel volume estimate,
   said measured process outputs comprising a consumed fuel volume measurement.

49. The method of claim 40 further comprising computing an applied command combination from said discrete performance setpoint and said optimal command combination using a transition control method comprising:
   ramping elements of said applied command combination toward respective elements of said optimal command combination; and
   delaying said ramping of a subset of said elements of said applied command combination to minimize an adverse performance response.

50. The method of claim 49 wherein said act of delaying said ramping further comprises waiting a specified time, said specified time being a function of said optimal command combination and a previous value of said applied command combination.

51. The method of claim 49 wherein said act of delaying said ramping further comprises:
   calculating a predicted performance response due to said ramping said elements of said applied command combination; and
   delaying said ramping of said subset of said elements of said applied command combination until said predicted performance response satisfies a transition performance criterion.

* * * * *